United States Patent Office 3,334,274
Patented Aug. 1, 1967

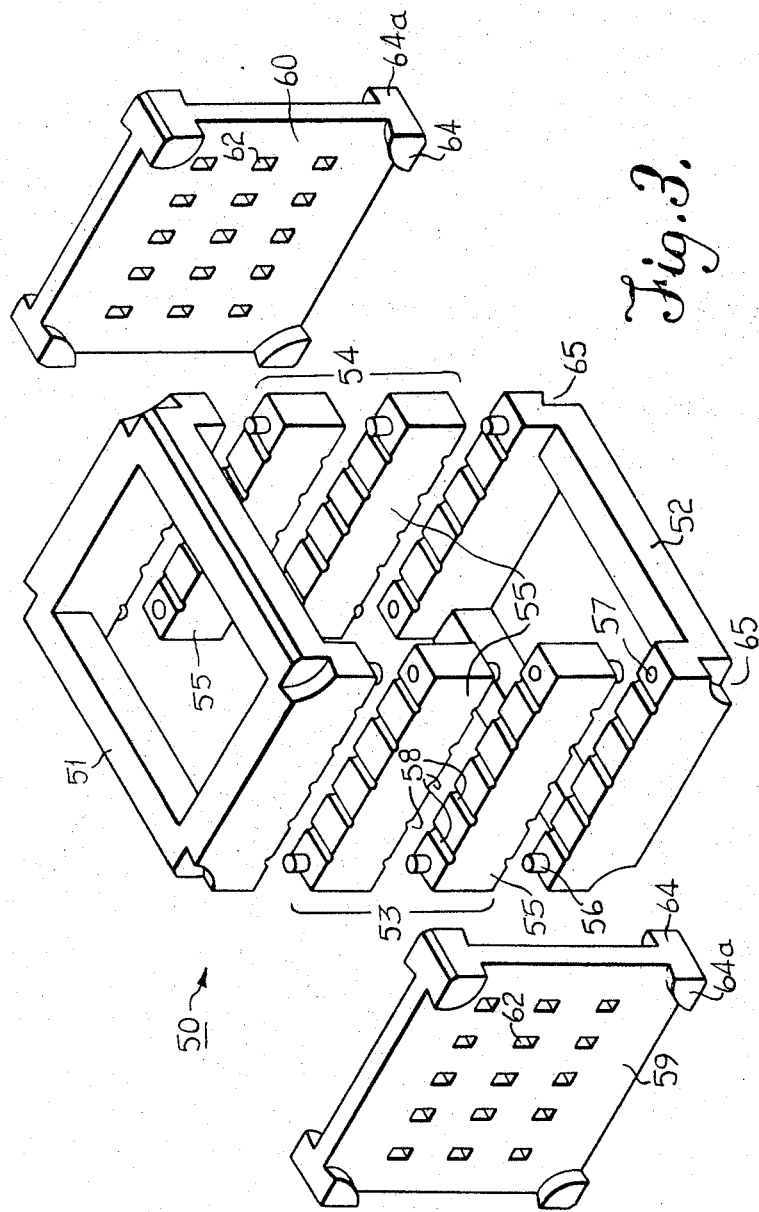

3,334,274
ELECTRIC CIRCUIT MODULES
Bloomfield James Warman and Derek Peter Garrett, London, and Raymond John Frederick Derbyshire, Welling, England, assignors to Associated Electrical Industries Limited, London, England, a British company
Original application Apr. 13, 1964, Ser. No. 359,345, now Patent No. 3,302,068, dated Jan. 31, 1967. Divided and this application June 10, 1965, Ser. No. 462,924
Claims priority, application Great Britain, Apr. 23, 1963, 15,992/63
7 Claims. (Cl. 317—99)

The present application is a division of application Ser. No. 359,345, filed Apr. 13, 1964, now Patent No. 3,302,-068, issued Jan. 31, 1967, and hereinafter referred to as the parent application. The invention relates to assemblies of electric circuit elements which can be used in building up an overall circuit organisation of modular construction. The term "circuit element" includes electrical conductors as well as other circuit elements.

In the parent application various forms of module construction are described each of which, in accordance with the present invention, includes for the circuit elements included in the module a support structure having end-faces each formed by an end check, end plate or the like and each of generally rectangular shape provided at its corners with respective quadrantal projections such that if four such modules are assembled together side-by-side in a "square" the quadrantal projections at the central corners of these modules will together constitute a composite projection of substantially circular form over which can be applied an annular fixing member embracing the four quadrants to hold the modules in their side-by-side relationship.

The present invention in various embodiments thereof is illustrated by way of example in the accompanying drawings abstracted from those filed in the parent application with the omission of details which are irrelevant to the invention.

FIG. 3 illustrates an embodiment taken from FIG. 7 of the parent application drawings and applicable to modules for containing assemblies of circuit components.

To facilitate comparison the various parts appearing in the accompanying drawings have been given the same reference characters as the corresponding parts in the parent application drawings.

Figure 1:
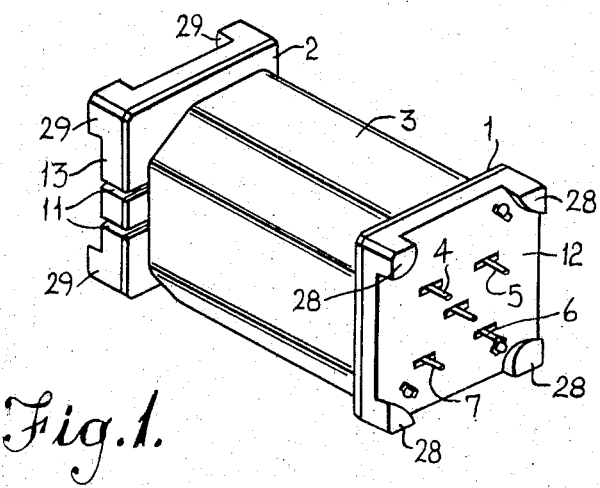
FIG. 1 illustrates an embodiment applicable to a reed relay module, being assembled from the relevant parts of FIGS. 2 and 3 of the drawings of the parent application.

Referring to FIG. 1, at least the operating coil and the reed contact units of a reed relay (none of them being visible) are located within a screening member 3 between end plates 1 and 2 against which are secured outer end plates 12 and 13 respectively. The end plates extend beyond the periphery of the screen 3 on all sides so that the whole module is contained within a modularly dimensioned rectangular volume bounded by the planes containing the edges of the end plates. Terminal members from the contact units, which are assumed located within the operating coil, project through the end plates 1 and 12 at one end as indicated at 4–7 and likewise (not shown) through the end plates 2 and 13 at the other end. Also at this other end terminal members (not shown) from the operating coil extend through the plates 2 and 13 by way of slots 11.

Figure 2:
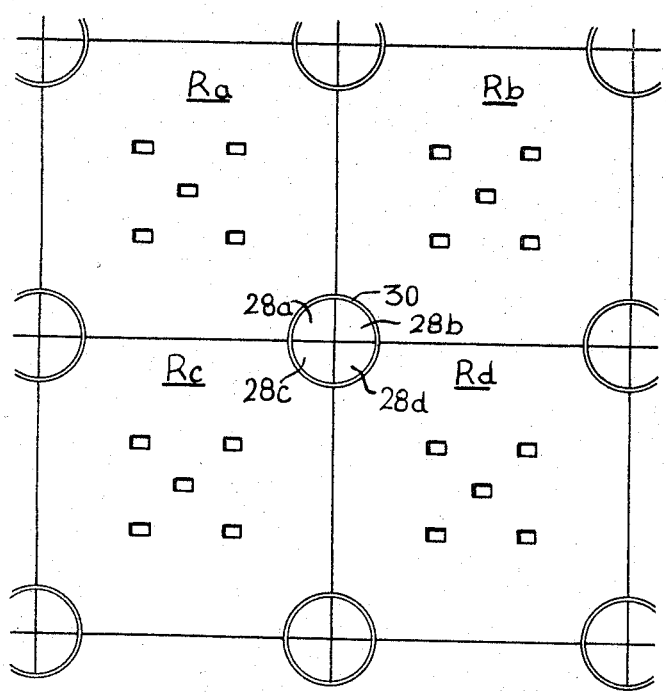
FIG. 2 illustrates the manner of assemblying a plurality of the modules (seen in end view) into a matrix, this figure having been abstracted from FIG. 4 of the parent application.

The end plates 12 and 13 have quadrantal projections 28 and 29 on their outer surfaces at each corner. To build up a matrix of the modules the requisite number are assembled side-by-side in rows and columns with adjacent edges of their end plates abutting. This is shown in FIG. 2, in which four of the modules Ra, Rb, Rc and Rd are fully shown and others fragmentarily.

The quadrantal projections such as 28a, 28b, 28c and 28d at the meeting point of the end plates of each four modules such as Ra, Rb, Rc and Rd are embraced for example by a spring clip 30. This mode of assembly, utilised at both ends of the modules, has the advantage that the spring clips such as 30 can impose between adjacent modules a spring loading action which pulls them into alignment irrespective of differences of size arising from manufacturing tolerances. Instead of using such clips, the corners of the end plates may be chamfered so that at each meeting point a central hole will be left through which a fixing screw can be passed to hold the modules together in conjunction with flanged washers over the quadrantal projections at each end.

Referring now to FIG. 3, the module housing 50 (shown in exploded perspective view) is intended to contain a circuit assembly having terminal members extending from it parallel to each other at two opposite sides, such an assembly being illustrated in FIG. 6 of the parent application. The module 50 comprises frame members 51 and 52 and end walls 53 and 54 built up from spacing members 55. The members 51, 52 and 55 which are of an insulating, preferably moulded plastics, material are formed on their facing surfaces with dowel projections 56, co-operating locating holes 57 and pairs of coincident grooves 58. The members 51, 52 and 55 fit together to form a generally recangular housing 50 in which the circuit assembly can be accommodated with its terminal members (not shown) projecting through apertures formed in the end walls 53, 54 by the pairs of grooves 58. Over the projecting terminal members at one end and at the other end fit respective end plates 59 and 60 having openings 62 by which the terminal members pass through the relevant end plate. Quadrantal projections 64 on the inner surfaces of the end plates 59 and 60 fit within correspondingly shaped recesses 65 on the frame members 51 and 52 to locate the end plates in position when applied. External quadrantal projections 64a on the end plates serve the same purpose as the projections 28 and 29 in FIGS. 1 and 2: they are shown as having a tapered undercut to locate an embracing clip such as 30 more securely.

Figure 4:
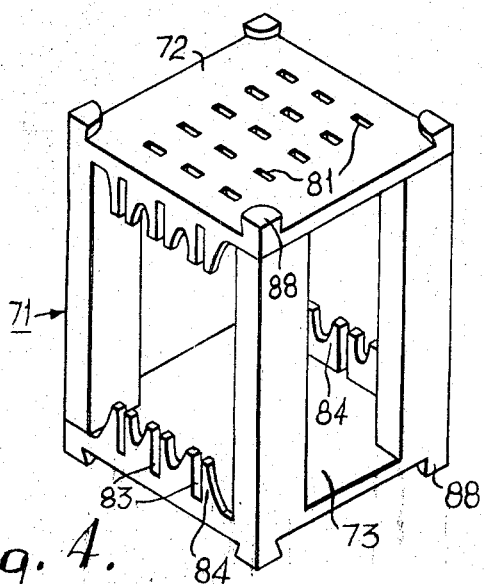
FIG. 4 illustrates an embodiment taken from FIG. 8 of the parent application drawings and applicable to modules for containing wiring assemblies such as are shown in the said FIG. 8 but have been omitted herein.

The module housing 71 in FIG. 4 can accommodate prefabricated wiring assemblies (not shown) in the form of a lamina base carrying conductors arranged in a co-ordinate matrix with the conductors of one ordinate extended to form terminal portions which project beyond at least one edge of the base. The housing 71 is built up from two similar interfitting parts (not shown) each providing one of two end cheeks 72 and 73 and both formed with complementary side portions. Between the two end cheeks 72 and 73 the wiring assemblies are located parallel to each other, with their projecting terminal portions extending out through holes such as 81 in the end cheek 72, by means of slots such as 83 formed in inwardly extending edge projections 84. Quadrantal projections 88 at the corners permit the modules to be assembled in a matrix with other modules by means of spring clips embracing the four quadrantal projections at each meeting point of four modules as before.

What we claim is:

1. An electric circuit module comprising circuit elements, a support structure housing said elements, at least one end face of substantially rectangular shape provided on said support structure, a quadrantal projection upstanding from each corner of said end face, the two planes forming the sides of each quadrantal projection meeting at the respective corner of the end face, whereby when four such modules are assembled together side-by-side with their end faces substantially co-planar, all end faces having one corner lying on a single line of intersection, the four upstanding quadrantal projections at the said line of intersection of these modules will together constitute a composite projection of substantially circular form adapted to receive an annular fixing member which by embracing the composite projection will hold the modules in their assembled relationship.

2. A circuit module as claimed in claim 1, including a second end face at the end of the module opposite from the end having the first end face, and wherein at least one of said end faces is presented by a end cheek portion of the structure formed integrally with the quadrantal corner projections for that end.

3. A circuit module as claimed in claim 1, including a second end face at the end of the module opposite from the end having the first end face, and, wherein at least one of said end faces is presented by an end plate assembled against the outer surface of an end cheek of the structure.

4. A circuit module as claimed in claim 3, wherein said end plate is formed integrally with the quadrantal corner projections for its end face.

5. A circuit module as claimed in claim 4 with quadrantal corner recesses provided at the corners of said end cheek and further quadrantal corner projections upstanding from the corners of the inner face of said end plate engaging respective ones of said recesses.

6. A circuit module as claimed in claim 3, whereof the support structure is of composite form built up from two frame members forming opposite sides of the structure in conjunction with spacer members constituting end cheeks thereof.

7. A circuit module as claimed in claim 1, whereof the quadrantal corner projections have tapered undercuts to assist in securing an applied annular fixing member.

References Cited
UNITED STATES PATENTS 3,065,384  11/1962  Sprude _____ 317—101

ROBERT K. SCHAEFER, *Primary Examiner.*

M. GINSBURG, *Assistant Examiner.*